United States Patent [19]

Nor et al.

[11] Patent Number: 5,548,200

[45] Date of Patent: Aug. 20, 1996

[54] UNIVERSAL CHARGING STATION AND METHOD FOR CHARGING ELECTRIC VEHICLE BATTERIES

[75] Inventors: Jiri K. Nor, Oakville; Josef V. Soltys, Mississauga, both of Canada

[73] Assignee: Norvik Traction Inc., Mississauga, Canada

[21] Appl. No.: 275,878

[22] Filed: Jul. 6, 1994

[51] Int. Cl.$^6$ ................................................ H02J 7/04
[52] U.S. Cl. ............................... 320/27; 320/2; 320/48
[58] Field of Search ................................ 320/2, 14, 21, 320/27, 48

[56] References Cited

U.S. PATENT DOCUMENTS

| | | | |
|---|---|---|---|
| 4,532,418 | 7/1985 | Meese et al. | 320/2 X |
| 5,179,335 | 1/1993 | Nor | 320/21 |
| 5,191,277 | 3/1993 | Ishikura et al. | 320/22 |
| 5,202,617 | 4/1993 | Nor | 320/2 |
| 5,204,611 | 4/1993 | Nor et al. | 320/21 |
| 5,206,578 | 4/1993 | Nor | 320/14 |
| 5,327,066 | 7/1994 | Smith | 320/2 |
| 5,341,083 | 8/1994 | Klontz et al. | 320/2 |

FOREIGN PATENT DOCUMENTS 0533317  6/1992  European Pat. Off. ......... H01M 2/10

Primary Examiner—Peter S. Wong
Assistant Examiner—Patrick B. Law
Attorney, Agent, or Firm—Donald E. Hewson

[57] ABSTRACT

A method and apparatus for charging the battery of an electric vehicle are provided. When the electric vehicle is connected to a charging station, it is interrogated to determine the nature of the charge controller that is on board the vehicle; and logic decisions invoking the particular mode for charging the vehicle are made depending on the nature and type of charge controller that is on board the vehicle. Thus, delivery of charging energy to the battery in the vehicle may be entirely under the control of a charge controller on board the vehicle; or if the control module in the vehicle is less sophisticated then delivery of charging energy will be under the control of a charging module within the charging station. Parameters of initial charging current and voltage are therefore set either by the on board battery charging controller, or the charge controller in the charging station; alternatively, those parameters may be set manually or by insertion of a card into a data interface to establish initial charging conditions. Under controlled conditions, a plurality of vehicles may be charged at a single establishment having a plurality of charging stations, either sequentially or simultaneously, depending on the criteria to be established. The charging station may be privately owned, so as to charge a fleet of vehicles; or there may be a plurality of charging stations at a publicly accessible service station.

20 Claims, 4 Drawing Sheets

UNIVERSAL CHARGING STATION AND METHOD FOR CHARGING ELECTRIC VEHICLE BATTERIES

FIELD OF THE INVENTION

This invention relates to apparatus and methods for providing fast recharging of electric vehicle batteries. In particular, the present invention provides a charging station and a method for charging the battery of a vehicle whereby delivery of charging energy to the electric vehicle battery may be accomplished no matter what kind of charge controller may be on board the vehicle and associated with the electric vehicle battery.

BACKGROUND OF THE INVENTION

Fast charging of batteries is now becoming well known. Reference will be made, hereafter, to several patents which are commonly owned herewith, and which teach various aspects of fast battery charging. Electric vehicles are now becoming more popular for a variety of reasons. Indeed, electric vehicles may become mandated to a greater or lesser extent due to the imposition of regulations requiring that at least a certain percentage of vehicles sold by any one manufacturer of vehicles—especially, passenger cars with seating from two to nine passengers, including the driver—and which are conventionally powered by internal combustion engines, must also include a specific number of vehicles that are so-called "zero emission" vehicles. That means thin such vehicles have no emissions of noxious gasses, and the most common type of vehicle which would meet such stringent standards is an electric vehicle. Electric vehicles are powered by batteries, and present a number of problems or other difficulties to be overcome.

Not the least among those problems is the fact that in order for an electric vehicle to have any reasonable range—the distance that it can be driven—there has to be significant energy storage by way of batteries on board the vehicle. As the vehicle is driven, it removes energy from the batteries, converting it to driving power delivered to the wheels of the vehicle, and thus there is only a finite distance or period of time over which the vehicle can be operated without requiring that the batteries be recharged.

Other related conditions also arise in respect of fleets of vehicles that are privately or corporately owned, but which may have differing purposes. For example, large manufacturing plants, distribution warehouses, and the like, may have a very considerable number of battery powered fork lift trucks, other traction or towing devices, and so on. Golf courses usually have a large number of golf carts to be rented by golfers playing a round of golf—indeed, some courses require that the players utilize a golf cart. Other such fleets may be localized, such as mail or courier package delivery carts that operate in a localized delivery route, day after day. All of those kinds of electric vehicles are also considered as candidates for becoming clients of charging stations in keeping with the present invention.

In another aspect of the invention, commercially operated "service stations" are contemplated. Thus, as the use of electric vehicles becomes more widespread, and such vehicles are essentially otherwise indistinguishable from ordinary passenger cars travelling on the roads, those cars may be driven further from home, or they may be rental vehicles used by visitors to a particular locale. In any event, there will be a growing requirement for such vehicles simply to pull into a station in much the same sense as an ordinary car would be driven into a service station for refuelling. In the case of an electric vehicle, however, instead of gasoline being placed into the fuel tank of the car, electrical energy is transferred into the batteries of the vehicle.

From the above, it is evident that there will exist a requirement for a significant number of charging stations to be available, as well as the requirement that each charging station should be capable of transferring electrical energy to the battery of the car as quickly as possible. Drivers of electric vehicles may be quite content to wait for 10 or 20 minutes for delivery of a significant amount of electrical energy (say, 20 to 50 kWh); but they will not be willing to wait a number of hours or overnight for their electric vehicle to be recharged.

Thus, the present invention demonstrates the awareness that there must be safe and efficient recharging in very short time periods; and, of course, in order for a charging station to deliver 20 to 50 kWh to an electric vehicle battery in 10 or 20 minutes, then the station must have high power ratings in the order of 100 to 300 kW. That makes such charging stations or battery chargers not likely to be widely distributed so as to be found in everyone's garage. More likely, such high power connections to the locally available power distribution grid are likely to be approved and located in more widely spaced distributions, perhaps not unlike the manner in which gasoline refuelling service stations are presently distributed, or even into strategic locations such as downtown public parking lots, and the like.

This, however, gives rise to yet another problem which is manifest with respect to electric vehicles, and will continue to be so. That is that electric vehicles such as automobiles and delivery vans, and the like, may have vastly different battery capacities, battery voltages, and perhaps even battery types.

Thus, the present invention will overcome such difficulties by providing a universal charging station which has the capability of charging a large variety of electric automobiles and electric vehicles over a wide range of parameters—including, especially, initial charging current and initial voltage conditions under which the charging operation will take place.

There is, of course, the requirement that any vehicle which shall be charged must have an appropriate and compatible power connector or receptacle in order for it to be connected to a charging stations in keeping with the present invention, and that requirement is self-evident. Of course, it is also evident that a power connector by which an electric vehicle is connected to a charging station must, therefore, have at least two wires that are capable of carrying the maximum value of charging current to be delivered; and moreover, as will be discussed in greater detail hereafter, there must also be communication means that are capable of transferring data concerning the state of charge of the battery being charged between the battery and the charging station.

It is, of course, taken for granted that any battery to be charged must be capable of accepting an initial charging current at a rate greater than 1C—that is, at a rate in amperes that is greater than the capacity in ampere-hours of the battery.

It is anticipated that, in the future, most electric vehicles will be equipped with a Battery Energy Management System (BEMS). Such a system may be programmed so as to utilize charging algorithms which have been developed and are now becoming available to the market in association with the trade mark MINIT-CHARGER of Norvik Technologies Inc., the Assignee herein. Of course, other algorithms, or other battery charge controllers can be utilized, as discussed hereafter.

Thus, the present invention provides for a universal charging station which is capable of charging a great variety of electric vehicles, whether or not they have on board a sophisticated Battery Energy Management System controller, or other controllers, or even if they have no on-board controller at all. Accordingly, a universal station in keeping with the present invention will, itself, be equipped with a power section—whose sole function is to deliver charging energy to the battery—and a charge control module whose purposes are described hereafter. The modes in which the universal charging station of the present invention may operate are, in descending order of their sophistication, as follows:

First, the charging station may function as a controlled current source under the control of a battery specific charging control module that is on board the electric vehicle. In that case, the controller section of the charging station acts as a slave to the on-board battery specific charging control module in the electric vehicle, in a classical master-slave configuration.

Next, the charging station of the present invention may function substantially in keeping with MINIT-CHARGER technology, whereby the parameters of maximum initial charging current and nominal initial charging voltage may be more or less automatically established by polling the electric vehicle to determine if there is on board a module which at least identifies the maximum charging current and nominal charging voltage to which the battery should be initially subjected.

Finally, in a lesser degree of sophistication, the universal charging station of the present invention may operate in a mode by which the parameters of maximum initial charging current and nominal charging voltage have been entered either manually or through a data interface by insertion of a card on which such data may be encoded.

In the first instance, the on-board battery specific charging control module which is present in the electric vehicle makes the decisions, and sends signals to the charging station as to the magnitude and the timing of the charging current. In the latter two instances, control of the charging function is exercised by the charge control module located in the charging station.

Of course, it is understood that the electric vehicle battery voltage, and the initial charging current to be delivered to the battery, are within the compliance range of the charging station of the present invention. Setting and initializing the power section for delivery of a specific voltage at a specific current are in keeping with obvious techniques, and are outside the scope of the present invention.

There is, therefore, the provision made by the present invention that charging stations in keeping with the guidelines established hereby will offer enhanced "user friendliness" through its features. They may, for example, include a credit or debit card interface, whereby a retail customer may simply and easily pay for the energy delivered to his electric vehicle battery. The charging station may include registers whereby the initial charging current and nominal charging voltage may be manually entered; or it may include a data interface whereby a card that is encoded with initial current and voltage settings required for specific battery carried in the electric vehicle may be inserted into the data interface to ensure that no mistakes or operator errors occur. That card may have the nominal charging voltage and maximum charging current data encoded into it such as by a magnetic stripe or by punched holes, or by embossed depressions and/or mounds, with the assumption that the data interface is compatible with any such card.

Still further, a charging station of the present invention might well be equipped with a meter which might define in advance the amount of energy to be delivered to the battery or the monetary price of the energy to be delivered to the battery, and appropriate shut off means to terminate the delivery of charging current when a predetermined amount of energy has been delivered or a predetermined monetary price of the energy has been delivered, whichever occurs first. Even further, the unit monetary price of the energy could be varied by controllers within the charging station, whereby the unit price for energy to be delivered from it may be dependent upon the time of day—it generally being understood that delivery of charging energy during ordinary daytime hours when demand for delivery of electrical energy from the local power authority is quite high, and that the unit price for the energy might be higher than in the evening when many offices, stores, and factories, etc., have shut down for the day.

There may also be other load management and other functions such as facilities to bill the cost for charging energy delivered to an electric vehicle to the vehicle operator's office, interlock provisions to prevent theft of charging energy except with appropriate authorization to operate the charging station, and so on.

Thus, when the concept of the charging station is extended to a service station, there may be a number of similar charging stations or "charge dispensers" that are physically separated one from the other so that a plurality of electric vehicles can be accommodated at the same time. As discussed hereafter, a plurality of electric vehicles might be placed before a plurality of charging stations, all of which are conveniently connected to and fed by a single rectifier. In any event, depending on the conditions, the multiple charging stations may be operated sequentially so as to charge one electric vehicle at a time, or several may be operated simultaneously provided that the amount of charging energy delivered at any one time does not exceed a predetermined maximum. In either event, priorities or other function controls may be imposed to ensure efficient utilization of the multiple charging stations connected to a common rectifier source. Of course, it also follows that local energy storage devices such as a flywheel unit or stand-by batteries might be provided for load levelling and so as to limit the peak power being drawn from the distribution power grid supplied by the local power authority.

It will also be understood that the operating functions of charging stations generally in keeping with the present invention will depend, at least in part, on the ability of the power section in the charging stations to turn on and turn off very quickly. Moreover, there may be provided a monitoring system which monitors the data communication link between the electric battery being charged and the power station, and the charge controllers may be established in such a manner that they continuously monitor and exchange signals periodically—say, every 0.5 to 2 seconds. The monitoring system would determine if there has been no communication of data over the communication link for a predetermined period of time—say, 4 to 6 seconds—and if so, signals would be initiated to shut down the charging operation so as to avoid serious implications of over-charge to the battery.

DESCRIPTION OF THE PRIOR ART

For a greater understanding of the present invention, and for greater discussion of underlying technologies and/or related circumstances as those to which the present invention applies, Applicant refers to the following patents:

First, a basic teaching of fast charging battery chargers is found in NOR U.S. Pat. No. 5,179,335, issued Jan. 12, 1993. That patent teaches battery chargers where the electric charging power delivered to the battery is periodically interrupted for a preselected timed interval so as to permit the detection of the internal resistance free voltage of the battery during the interruption of the charging power. Circuitry is provided for comparing the internal resistance free voltage with a preselected reference voltage; and additional circuitry is provided to reduce the power being delivered to the battery when the internal resistance free voltage of the battery exceeds the preselected reference voltage. Thus, the rate of charging the battery is gradually reduced.

NOR U.S. Pat. No. 5,202,617, issued Apr. 13, 1993, teaches a fundamental charging station for electric vehicles. There, the electric vehicle battery may be charged either under control of a on-board controller, or the charging operation may be manually controlled. The patent requires a power connector and associated power cable for connecting to the vehicle, an interface with signal cables to carry status and/or control signals between the vehicle and the power controller within the charging station, and a lockout which precludes delivery of power to the vehicle except when the power connector is in place. When the charging operation is under the control of an on-board controller, the operation of the charging station is battery specific, and thus the operating parameters of the charging station may vary from one electric vehicle to another.

NOR et al were issued U.S. Pat. No. 5,204,611 on Apr. 20, 1993, for a more advanced battery charger. There, the resistance free terminal voltage of the battery is detected during an interval when the charging current is interrupted and compared against an independent reference voltage; but the reference voltage may altered at any instant in time as a function of the ambient temperature, or the internal temperature or pressure of the battery, or as a function of the charging current when it is within a predetermined range, or even if a particular change in the value of charging current occurs over a predetermined period of time. These various provisions preclude, for example, thermal runaway, and they assure very rapid and complete charging operations for the battery no matter what its condition may have been when it was first connected to the battery charger, provided that it is capable of accepting charge in the first instance.

Finally, NOR U.S. Pat. No. 5,206,578, issued Apr. 27, 1993, teaches a monitoring system for batteries during charge or discharge whereby terminals are placed between adjacent pairs of modules and at the end of each battery so that voltage across each module may be measured at the pair of terminals that defines that module. Some or all of the modules may be tested periodically, such as by appropriate operation of a multiplexer. Alarms may be triggered in the event that module voltages are outside of predetermined limits. The testing may, in fact, continue no matter whether the battery is being charged or discharged.

SUMMARY OF THE INVENTION

In accordance with one aspect of the present invention, there is provided both a method of charging the battery of an electric vehicle, and a charging station at which the charging operation might take place. In each case, the battery must be capable of accepting initial charging current at a rate greater than 1C, and of course the charging station must be capable of delivering that charging current at a preset voltage which is suitable for the battery being charged. In general, the apparatus is such as to provide means for following the method of charging in keeping with the present invention, which includes the steps of:

(a) Establishing a connection of lines between the battery to be charged and the charging station, where there are at least two wires capable of carrying the maximum value of charging current to be delivered. Also, further communication means are provided that are capable of transferring data concerning the state of charge of the battery being charged between the battery and the charging station.

(b) The vehicle is interrogated over the communication means to determine if there is present and associated with the battery in the vehicle a battery specific charging control module, or if there exists in the vehicle a personality module which identifies at least the criteria of maximum charging current and nominal charging voltage under which the battery may be charged in the shortest period of time. In the absence of either a battery specific charging module associated with the battery or a personality module which identifies at least the criteria of maximum charging current and nominal charging voltage, the vehicle is interrogated as to whether there at least exists a monitoring means to determine the value of terminal voltage of the battery being charged. The charging station of the invention comprises the appropriate means for performing those interrogation steps.

(c) In the event that a battery specific charging control module is present in the vehicle, then the present invention provides means for following the step of charging the battery by delivering charging current thereto under the control of the battery specific charging control module which is on board the vehicle. In other words, the charging control module is, in this case, battery specific. Delivery of the charging current to the battery is halted in keeping with a signal to do so that is issued by the on board battery specific charging control module. Subsequently, the battery may be disconnected from the charging station.

(d) In the event that the interrogation has determined that a personality module is present in the vehicle which at least identifies the maximum charging current and nominal charging voltage, then the battery is charged by delivering charging current thereto at the maximum charging current and nominal charging voltage. The charging current is periodically halted and the instantaneous resistance free terminal voltage of the battery is determined during each interval of time that charging current flow has halted; and the resistance free terminal voltage is compared to a reference voltage that is stored in the charge control module which is present in the charging station. Charging current is thereby reduced under control of that charge control module, which also stops delivery of the charging current in keeping with a signal issued by the charge control module. Means are provided to exercise those functions. Subsequently, the battery may be disconnected from the charging station.

(e) In the event that there at least exists in the vehicle a monitoring means to determine the value of the terminal voltage of the battery being charged, then means are provided for presetting the charge station to the predetermined allowable values of nominal charging voltage and maximum charging current, and also for presetting a maximum value of charging energy to be permitted to be delivered to the battery. Then, the delivery of charging current is periodically halted, and the instantaneous resistance free terminal voltage of the battery is determined and compared against a reference voltage stored in the charge control module of the charging station. Charging current is reduced under the control of the charge control module in the charging station, and charging current is halted in keeping with a signal issued by the charge control module.

Subsequently, the battery may be disconnected from the charging station.

In each of (c), (d), or (e), the signal to stop delivery of the charging current and data which is indicative of the instantaneous terminal voltage of the battery, are transferred between the battery and the charging station over the communication means.

BRIEF DESCRIPTION OF THE DRAWINGS

Embodiments of this invention will now be described by way of example in association with the accompanying drawings in which.

DETAILED DESCRIPTION OF THE PREFERRED EMBODIMENTS

Reference will now be made to FIGS. 1 through 4.

Figure 1:
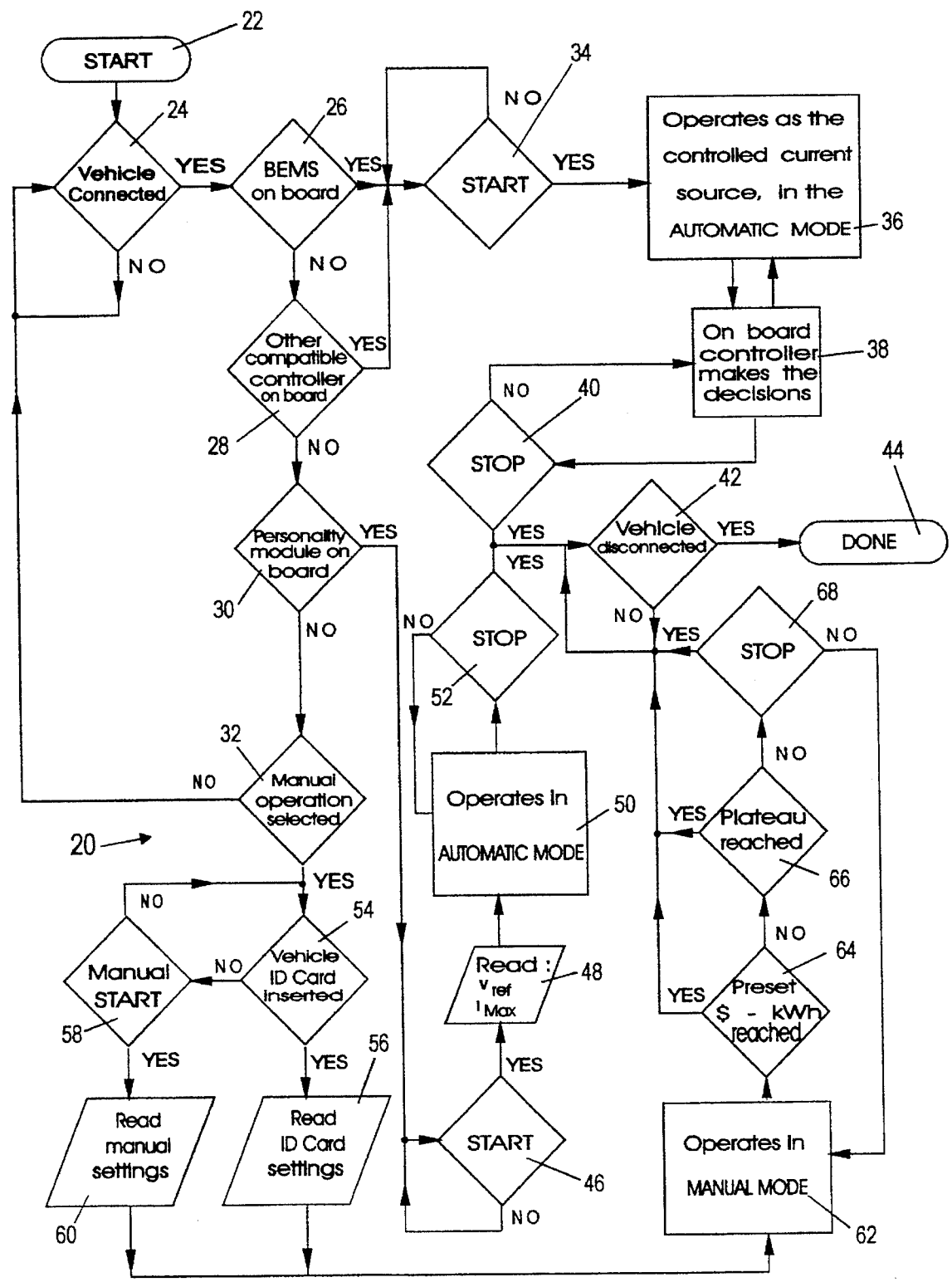
FIG. 1 is a logic flow chart showing the interrogation and various charging schemes which might be carried out in charging an electric vehicle from a universal charging station in keeping with the present invention.

First, having regard to FIG. 1, a typical logic flow diagram 20 for operation of a charging station in keeping with the present invention is provided. At the start 22, a determination is made at 24 as to whether there is a vehicle connected to the charging station. If yes, the vehicle is interrogated at 26 to determine if there is a Battery Energy Management System on board the vehicle. If no, the vehicle is interrogated at 28 to determine if there is any other compatible battery specific charging control module on board the vehicle; and if no, the vehicle is interrogated at 30 to determine if there is a "personality module" on board the vehicle whereby the personality module will at least identify the criteria of maximum charging current and nominal charging voltage under which conditions the battery may be charged in the shortest possible time period. In the absence of the personality module, the decision is made at 32 as to whether the charging station will be manually operated. If no, the logic loops back to 24, where a determination is made if there is, indeed, a vehicle connected to the charging station. If manual operation is selected at 32, there must at least be present on board the vehicle a monitoring means which determines the terminal voltage of the battery being charged.

Now, if either step 26 or 28 determines that there is a battery specific charging control module on board the vehicle, then charging operation is started at 34. Operators 36 and 38 indicate that the on-board battery specific charging control module operates the charging station as a controlled current source with the on board controller making all of the decisions as to the value of charging current and voltage at any instant in time. There are also start and stop commands that are issued repetitively, for example every second, which are part of the monitoring function to determine if the charging operation is proceeding normally, and if the established criteria for charging current and voltage at any instant in time are still being followed. Sooner or later, usually when the battery is charged, a decision is made at 40 to stop the charging operation. If so, then the charging station interrogates at 42 to determine if the vehicle has been disconnected and if so, the charging operation is done as at 44.

Indeed, operation of the charging station as a controlled current source with the on-board battery specific controller making all decisions as to the value of charging current and voltage at any instant in time may, itself, comprise one of three alternative modes: (a) the battery is charged under control of the battery specific charging control module by periodically interrupting the flow of charging current to the battery, detecting the instantaneous resistance free terminal voltage of the battery during each interval of time when delivery of charging current has been halted, and comparing the instantaneous resistance free terminal voltage of the battery to a reference voltage stored in the charging control module associated with that battery; or (b) charging the battery under control of the battery specific charging control module and under conditions of constant current and constant voltage until a preset terminal voltage of the battery has been reached, and thereafter halting delivery of the constant charging current to the battery; or (c) charging the battery under control of the battery specific charging control module by sending pulses of charging current to the battery, following each pulse of charging current by briefly discharging the battery, and then halting all current flow to or from the battery until the initiation of the next charging pulse. Accordingly, the charging control module in the vehicle which is associated with the battery and is thereby battery specific will comprise: (a) means for periodically interrupting the flow of charging current to the battery, means for detecting the instantaneous resistance free terminal voltage of the battery during each interval of time when delivery of the charging current has been halted, and means for comparing the instantaneous resistance free terminal voltage of the battery to a reference voltage stored in the charging control module associated with the battery; (b) means for delivering a constant current at a constant voltage to the battery, means for determining when a preset terminal voltage of the battery has been reached, and means for halting delivery of the constant charging current to the battery; and (c) means for sending pulses of charging current to the battery, means for briefly discharging the battery following each pulse of charging current, and means for halting all current flow to or from the battery until the initiation of the next charging pulse.

If the decision is made at 30 that a personality module is on board the vehicle, then a start decision is made at 46. The voltage reference and maximum current readings are taken at 48, and control is passed to the charging station at 50. There, the charging station follows charging procedures and methods particularly as discussed in U.S. Pat. Nos. 5,202,617 and 5,204,611, mentioned above.

As before, stop commands are periodically issued, for example every second, and sooner or later the decision is made at 52 to stop the charging operation because the battery is fully charged. Once again, the charging station interrogates itself at 42 to determine if the vehicle has been disconnected, and if so the charging operation is done at 44.

Finally, if manual operation has been selected at 32, then a determination is made at 54 as to whether or not a vehicle identification card has been inserted into a data interface in the charging station. That vehicle identification card will establish the charging station settings for nominal charging voltage and maximum charging current; and if it is present, that step is taken at 56.

If no vehicle identification card has been inserted into the data interface on the charging station, then a manual start decision must be made at 58. If so, then the nominal voltage and maximum charging current must be manually entered into the registers on the charging station at 60.

As noted above, the charging station may be equipped with a meter which might define in advance the amount of energy to be delivered to the battery or the monetary price of the energy to be delivered to the battery, together with appropriate shut off means to terminate the delivery of charging current when a predetermined amount of energy has been delivered or a predetermined monetary price of energy has been delivered, whichever occurs first. Thus, the maximum value of charging energy to be delivered to the battery is accomplished by selectively setting the meter. Still further, as noted above, the unit monetary price of energy may be altered depending on the time of day when charging current flows to the battery.

After either step 56 or 60, the charge control module in the charging station takes over at 62. Once again, a number of decision steps must be followed; the first of those is at 64 where a determination has been made as to whether or not preset values of total kWh to be delivered to the battery have been reached, or if a predetermined price of energy has been reached. If yes, then immediately the charging function is terminated, and the charging station interrogates itself at 42 to determine if the vehicle has been disconnected. If the preset price or amount of energy to be delivered to the battery has not yet been reached, a decision is made at 66 as to whether any particular plateau—which typically would be whether the battery has achieved a specific terminal voltage—has been reached. If so, then once again the charging function is terminated, and the charging station interrogates itself as to whether or not the vehicle has been disconnected at 42. Finally, if neither inquiry at 64 or 66 has terminated the charging operation, then in the meantime and as before there have been periodic stop commands issued by the charge control module within the charging station. Sooner or later, that stop command will be accepted, and the decision will be made at 68 to terminate the charging function.

Of course, decisions to terminate the charging function may be made at 40, 52, 66, or 68, depending on the sophistication of the on board controller or the controller in the charging station, and depending on the amount of data being communicated across the data communications link, whereby the charging function might be terminated in the event that the internal temperature of the battery, or its internal pressure, become too high, or in keeping with other criteria more particularly as described in U.S. Pat. No. 5,204,611, introduced above.

Figure 2:
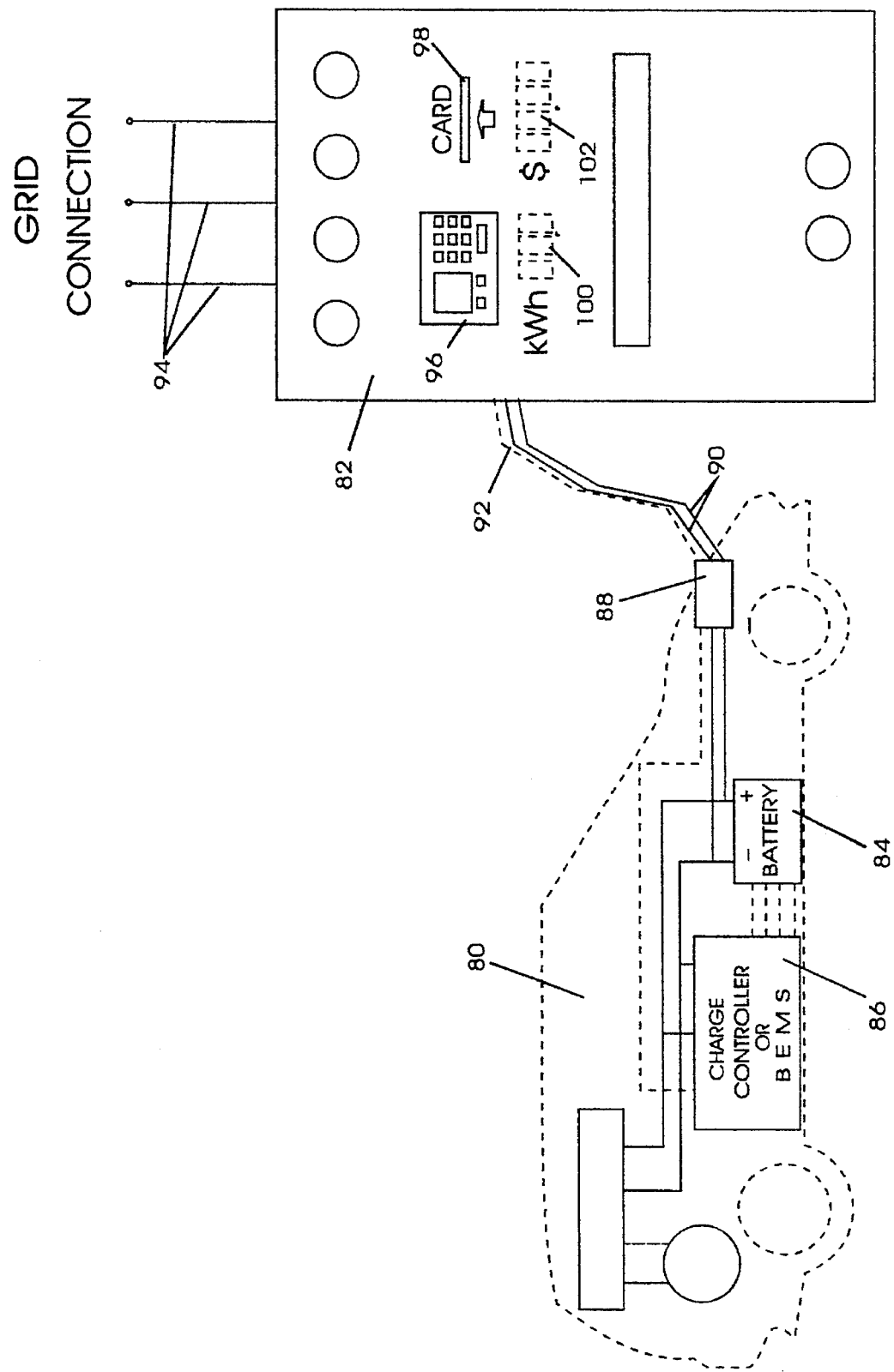
FIG. 2 is a representation of a single charging station and a single vehicle in a typical operating situation, where the battery of the vehicle is being charged by the charging station.

Turning now to FIG. 2, a vehicle 80 is shown being attached to a charging station 82. The vehicle has a battery 84 on board and may have a charge controller or Battery Energy Management System 86, or other monitoring device or module, as described above. The vehicle 80 is connected through connector 88 to the charging station 82.

There is a pair of wires 90 that are provided, and they are capable of carrying the maximum value of charging current to be delivered to the battery 84. There is also a data communication means 92 that is provided, and it may be dedicated data wires, or it may be a power link carrier device, or optical fibre. Opto-couplers and associated data transfer means may be provided, or inductive couplers with their associated transfer means. Alternatively, the data communication link may be a radio frequency transmitter and receiver located appropriately in each of the vehicle 80 and the power station 82. Appropriate wire, cable, or fibre connectors or transfer means will be provided for the radio frequency transmitter and receiver, as necessary.

The power station 82 is shown at wires 94 being connected to the grid connection, which is the high voltage AC power lines provided by the local power authority, and from which electrical energy is drawn. The face of the power station may be provided with a manual interface and key pad 96, or a card slot 98 that communicates with a data interface within the power station 82. In either event, there are registers thereby provided and associated with the key pad 96 and the card slot 98 by which settings of nominal charging voltage and maximum charging current may be established manually or by inserting a card into card slot 98. As noted above, the card and the data interface associated with card slot 98 will be compatible and may be such as to read "personality data" such as nominal charging voltage and maximum charging current that may be encoded into the card by a magnetic stripe, punched holes, or embossed depressions and/or mounds. Other annunciators 100 and 102 may be provided to give a running indication of the amount of energy being delivered in kWh or its cost in local currency, such as dollars.

In that regard, it has been noted that it may be appropriate to equip the utility interface on the front face of the charging station 82 with appropriate programmable registers or the like within the charging station to set the price per unit of energy depending on the time day. The time dependent pricing provides benefit for all of the power authority, the operator of the charging station, and the consumer, since higher daytime prices might tend to discourage operation of the charging station during peak energy consumption times during the day. It may be that the price to the operator of the charging station from the local power authority may vary depending on the time of day. In any event, there may be less demand on the power authority and economies to be realized by the consumer, if the charging station is operated at off-peak hours.

It should also be noted that the Battery Energy Management System 86 which is on board the vehicle 80 may also have with it suitable monitoring means to monitor the battery 84 during charge and/or discharge, as taught in U.S. Pat. No. 5,206,578, introduced above.

Moreover, the personality module which might be provided on board the vehicle 80, in place of the charge controller 86, may be designed to provide a calibrated divider network whose purpose is to make the battery 84 appear to the charging station 82 as if it is a standard lead/acid battery of known nominal voltage. Of course, at the same time, maximum charging current in established by the personality module. Thus, various electrochemical systems for the battery 84 may be accommodated.

Figure 3:
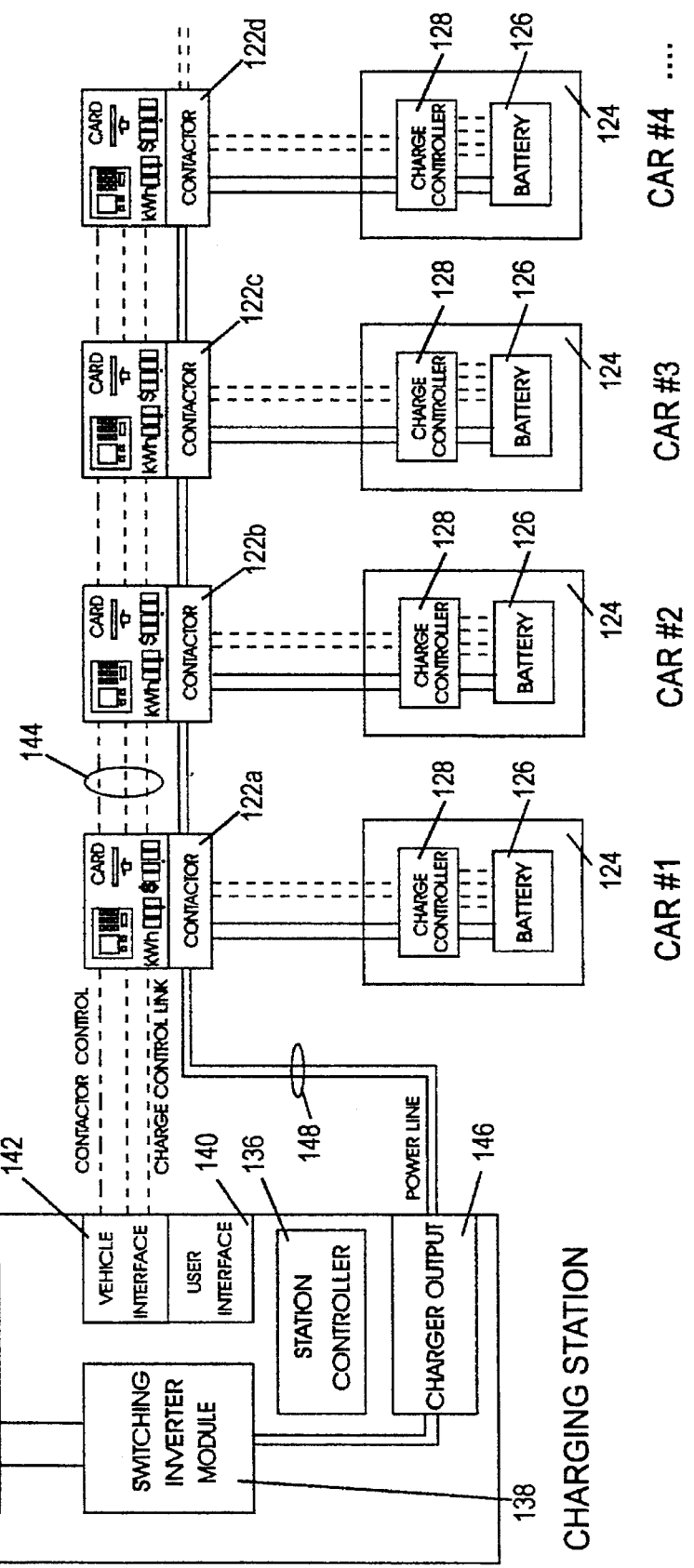
FIG. 3 is a typical general schematic of a multi-vehicle fleet charging station in keeping with the present invention.

Now, turning to FIG. 3, a typical system is shown as might be operated by a fleet operator who owns a number of electric vehicle which might be delivery vehicles, fork lift trucks, golf carts, rental vehicles, or the like. There, a plurality of vehicle batteries may be charged from the single charging station 120, by distributing charging energy to any one of a plurality of switches or contactors 122, to which a plurality of electric vehicles 124 may be connected. Each vehicle 124 has its own on board battery 126, and its own on board charge controller 128 in the present discussion.

The charging station 120 is connected to the distribution grid at 130, through a utility interface 132 and a common rectifier. Within the charging station 120 there is a station controller 136, a switching inverter module 138, a user interface 140, and a vehicle interface 142. The user interface may be the same as key pad 96, for example, shown in FIG. 2 and/or card slot 98. The vehicle interface 142 provides means by which a data communication link 144 communicates with the charging station 120. The charger output from the charging station is at 146, and a power line comprising a pair of wires 148 provides the charging current to each of the contactors 122.

Here, only one of the contactors 122 will be selectively closed at any one time. However, each of the contactors 122 has its own unique designation—for example, as indicated by the designations 122a, 122b, 122c, 122d, etc. Thus, means are provided to selectively close any one of the contactors while retaining the power line 148 in connection with all of the switches or contactors.

However, the decision as to the order of sequentially closing one at a time of the switches or contactors 122a, 122b, etc., may be established according to any one of a number of priority protocols. For example, it may well be that the operator or owner of the charging station and all of the vehicles connected to it might choose to establish no priority, and will close each of the switches or contactors 122a, 122b, etc., in sequence, accordingly to their respective unique designation. On the other hand, he may establish a priority as to which of the respective batteries 126 will be charged first by determining which of those batteries might require either the greatest amount of charging energy or the least amount of charging energy. The other batteries would then be ranked according to their respective charge requirements, either greater or lesser in keeping with the protocol being established. Alternatively, some other user-determined priority protocol may be established.

Figure 4:
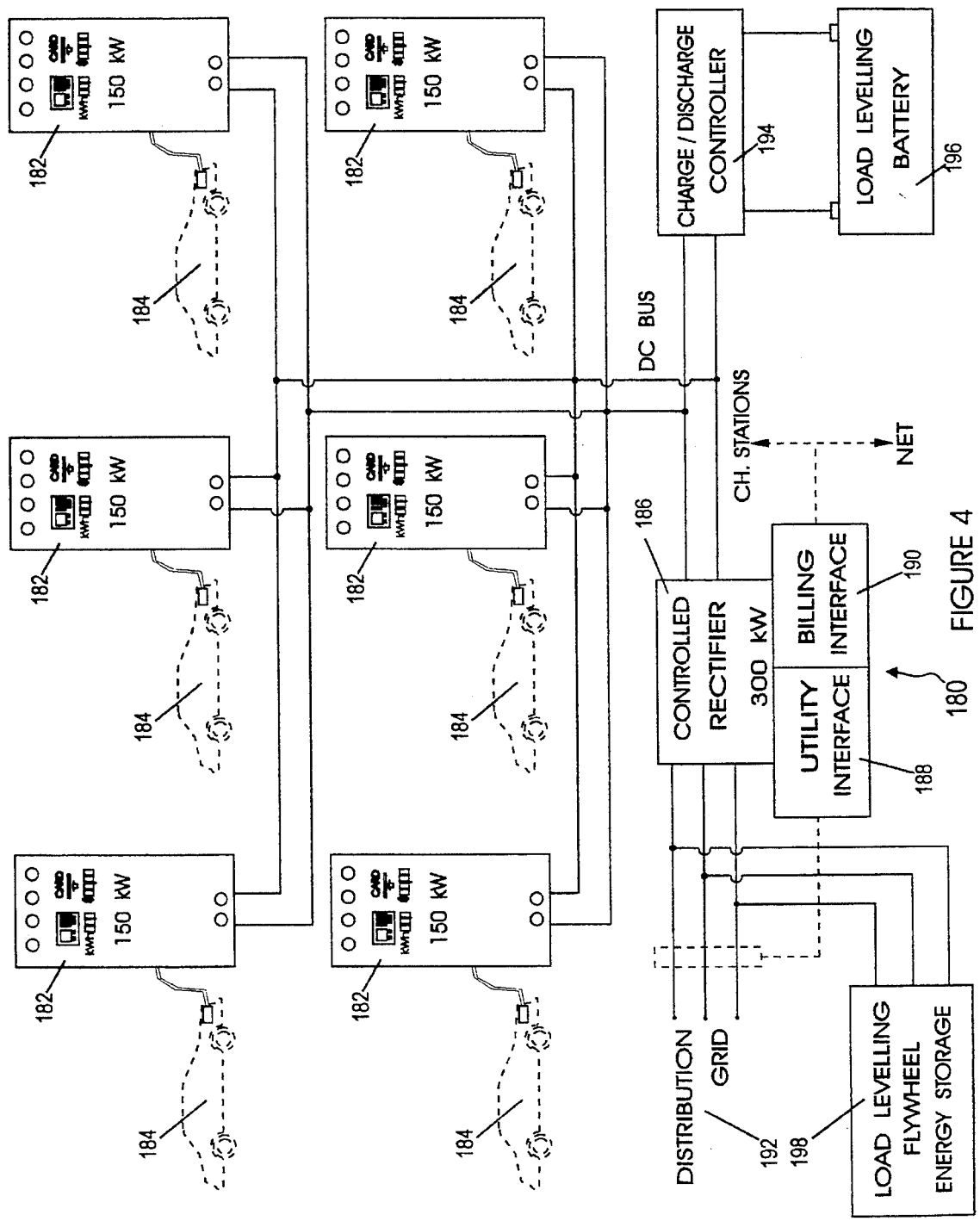
FIG. 4 is a typical general schematic of a multi-vehicle service station in keeping with the present invention.

Finally, with reference to FIG. 4, a typical public service station 180 is shown. Here, there are a plurality of charging stations or outlets 182, to each of which a vehicle 184 may be connected in much the same manner and using the same arrangements as shown in FIG. 2. Each charging station 182 may have essentially the same appearance and operation as charging station 82, described above in association with FIG. 2.

Each of the charging stations 182 within service station 180 may have a power rating of 150 kW. However, the single and common controlled rectifier 186 from which each of the charging stations 182 is supplied charging power may have a rating of 300 kW. It, of course, is provided with its own utility interface 188 and its own billing interface 190. The utility interface provides the appropriate connections to the distribution grid 192 which is provided by the local power authority; the billing interface 190 interfaces for purposes of accounting and management to each of the charging stations 182 and to such as a data network operated by credit card and debit card issuers.

It is possible that more than one vehicle 184 may be connected to more than one charging station 182 at any one time. If so, and if each of the associated electric vehicle batteries is absorbing maximum charging current at one time, the output from the controlled rectifier 186 may exceed its rating. In that case, a charge/discharge controller 194 may monitor the output of the controlled rectifier, and may be such as to issue signals which either reduce the output from each of the charging stations 182 that may be operating, or which might preclude the possibility of another of the charging stations 182 from coming on line until such time as the output from the controlled rectifier has reduced below the predetermined allowable maximum output.

Likewise, means may be provided for load levelling, whereby the energy demands by the controlled rectifier 186 from the distribution grid 192 may be reduced. For example, a load levelling battery 196 may be provided, or a load levelling flywheel energy storage device 198 may be provided. Their function is to accumulate energy during off-peak hours, when the price of energy from the distribution grid is low, and to support the service station 180 whenever necessary during peak hours. Obviously, the purpose of the charge/discharge controller 194 may also be to ensure that the load levelling battery 196 is recharged during off-peak hours to its maximum capacity.

There has been described apparatus and methods for charging one or a plurality of electric vehicles, where the charging station to which any electric vehicle may be connected is essentially universal in that it will accommodate a great variety of electric vehicles which may have on board controllers or which may rely on charge controllers within the charging stations.

Other modifications and alterations may be used in the design and manufacture of the apparatus of the present invention without departing from the spirit and scope of the accompanying claims.

What is claimed is:

1. A method of charging a battery for an electric vehicle, where the battery is capable of accepting initial charging current at a rate greater than 1C, and where a charging station from which the charging current is delivered to the battery is capable of delivering that charging current at a preset voltage which is suitable for the battery being charged; wherein said method comprises the steps of:

(a) establishing a connection of lines between the battery to be charged and the charging station, including at least two wires capable of carrying the maximum value of charging current to be delivered, and further communication means capable of transferring data concerning the state of charge of the battery being charged between the battery and the charging station;

(b) interrogating the vehicle over said communication means to determine if there is present and associated with said battery in said vehicle a battery specific charging control module, or if there exists in said vehicle a personality module which identifies at least the criteria of maximum charging current and nominal charging voltage under which conditions the battery may by charged in the shortest possible time period; or in the absence of a battery specific charging module associated with said battery or a personality module which identifies at least the criteria of maximum charging current and nominal charging voltage under which conditions the battery may by charged in the shortest possible time period, to determine if there exists in said vehicle at least monitoring means to determine the value of terminal voltage of the battery being charged;

(c) in the event that a battery specific charging control module is present in said vehicle, charging said battery by delivering charging current thereto under the control of said battery specific charging control module, stopping the delivery of charging current to said battery in keeping with a signal to do so issued by said battery specific charging control module, and subsequently disconnecting the battery from said charging station; or (d) in the event that a personality module which at least identifies the maximum charging current and nominal charging voltage is present in said vehicle, charging said battery by delivering charging current thereto initially at said maximum charging current and nominal charging voltage, periodically halting the delivery of charging current and determining the instantaneous resistance free terminal voltage of said battery during each interval of time when delivery of charging current has been halted and comparing said instantaneous resistance free terminal voltage to a reference voltage stored in a charge control module which is present in said charging station, reducing the charging current under control of said charge control module present in said charging station, stopping the delivery of charging current to said battery in keeping with a signal issued by said charge control module present in said charging station, and subsequently disconnecting the battery from said charging station; or (e) in the event that there at least exists in said vehicle a monitoring means to determine the value of the terminal voltage of the battery being charged, presetting the charge station to predetermined allowable values of nominal charging voltage and maximum charging current and presetting a maximum value of charging energy to be permitted to be delivered to said battery, periodically halting the delivery of charging current and determining the instantaneous resistance free terminal voltage of said battery during each interval of time when delivery of the charging current has been halted and comparing said instantaneous resistance free terminal voltage to a reference voltage stored in a charge control module which is present in said charging station, reducing the charging current under control of said charge control module present in said charging station, stopping the delivery of charging current to said battery in keeping with a signal issued by said charge control module present in said charging station or when said preset maximum value of charging energy has been delivered to said battery, and subsequently disconnecting the battery from said charging station;

wherein, in each of steps (c), (d), and (e), the signal to stop delivery of charging current, and data which is indicative of the instantaneous terminal voltage of said battery, are transferred between said battery and said charging station over said communication means.

2. The method of claim 1, wherein said communication means may be chosen from the group consisting of dedicated data wires, power link carrier devices, optical fibres, opto-couplers and associated data transfer means, inductive couplers and associated transfer means, and radio frequency transmitters and receivers.

3. The method of claim 1, wherein said charging control module in said vehicle associated with said battery is specific to said battery and is such as to control delivery of charging energy to said battery by (a) charging said battery under control of said battery specific charging control module by periodically interrupting the flow of charging current to said battery, detecting the instantaneous resistance free terminal voltage of said battery during each interval of time when delivery of charging current has been halted, and comparing said instantaneous resistance free terminal voltage of said battery to a reference voltage stored in said charging control module associated with said battery; or (b) charging said battery under control of said battery specific charging control module and under conditions of constant current and constant voltage until a preset terminal voltage of said battery has been reached, and thereafter halting delivery of said constant charging current to said battery; or (c) charging said battery under control of said battery specific charging control module by sending pulses of charging current to said battery, following each pulse of charging current by briefly discharging said battery, and then halting all current flow to or from said battery until the initiation of the next charging pulse.

4. The method of claim 1, wherein said module in said vehicle which at least identifies the maximum charging current and nominal charging voltage required for said battery is a preset calibrated divider network whose purpose is to make the battery in said vehicle appear to the charge control module present in said charging station as if it is a standard lead-acid battery having a known terminal voltage and a known acceptable maximum charging current.

5. The method of claim 1, wherein the step of presetting the charge station to predetermined allowable values of nominal charging voltage and maximum charging current is accomplished either by manually setting those values into value registers therefore, which are located in said charging station, or by inserting data into said value registers through a data interface located in said charging station, where said data interface is capable of reading a card which has said allowable values of nominal charging voltage and maximum charging current encoded into said card by any of a magnetic stripe, punched holes, embossed depressions, and embossed mounds, any of which are compatible with a specific said data interface.

6. The method of claim 1, wherein the step of presetting the maximum value of charging energy to be delivered to said battery is accomplished by selectively setting a meter to determine the amount of energy delivered to said battery or to determine the monetary price of the energy delivered to said battery, so as to terminate the delivery of charging current when a predetermined amount of energy has been delivered or a predetermined monetary price of energy has been delivered, whichever occurs first; and wherein the unit monetary price of energy may be altered depending on the time of day when charging current flows to said battery.

7. The method of claim 1, wherein a plurality of vehicle batteries may be charged from a single charging station, by distributing charging energy to any one of a plurality of switches or contactors, each of which has a unique designation, selectively closing only one of said plurality of switches or contactors at any one time, and charging the connected one of said plurality of vehicle batteries.

8. The method of claim 7, wherein the decision as to the order of sequentially closing one at a time of said switches or contactors is determined by one of (a) establishing no priority and closing said switches or contactors in sequence as to their respective unique designation; or (b) establishing a priority as to whether the respective batteries connected through each respective switch or contactor shall be charged in order of those batteries requiring either the greatest amount or the least amount of charging energy to be charged first, and thence in ranking charge requirements thereafter; or (c) selectively designating which battery is to be charged first in keeping with a user-determined priority protocol.

9. The method of claim 1, wherein at least the data which is indicative of the instantaneous terminal voltage of said battery are periodically transferred over said communication means, and if no such communication occurs within a predetermined period of time, said signal to stop delivery of charging current to said battery is issued and the flow of charging energy to said battery stops.

10. A charging station for charging a battery for an electric vehicle, where the battery is capable of accepting initial charging current at a rate greater than 1C, and where said charging station is capable of delivering that charging current at a preset voltage which is suitable for the battery being charged, comprising:

at least two wires capable of carrying the maximum value of charging current to be delivered to said battery, and communication means capable of transferring data concerning the state of charge of said battery being charged between the battery and the charging station;

means for interrogating the vehicle over said communication means to determine if there is present and associated with said battery in said vehicle a battery specific charging control module, or to determine if there exists in said vehicle a personality module which identifies at least the criteria of maximum charging current and nominal charging voltage under which conditions the battery may be charged in the shortest possible time period; or in the absence of a battery specific charging module associated with said battery or a personality module which identifies at least the criteria of maximum charging current and nominal charging voltage under which conditions the battery may by charged in the shortest possible time period, to determine if there exists in said vehicle at least monitoring means to determine the value of terminal voltage of the battery being charged;

means for charging said battery by delivering charging current thereto under the control of a battery specific charging control module in said vehicle in the event that a battery specific charging control module is present in said vehicle, and means for stopping the delivery of charging current to said battery in keeping with a signal to do so issued by said battery specific charging control module;

means for charging said battery by delivering charging current thereto, initially at a maximum charging current and a nominal charging voltage in the event that a personality module which at least identifies the maximum charging current and nominal charging voltage is present, means for periodically halting the delivery of charging current and determining the instantaneous resistance free terminal voltage of said battery during each interval of time when delivery of charging current has been halted, means for comparing said instantaneous resistance free terminal voltage to a reference voltage stored in a charge control module which is present in said charging station, means for reducing the charging current under control of said charge control module present in said charging station, and means for stopping the delivery of charging current to said battery in keeping with a signal issued by said charge control module present in said charging station; and means for presetting the charge station to predetermined allowable values of nominal charging voltage and maximum charging current in the event that there at least exists in said vehicle monitoring means to determine the value of the terminal voltage of the battery being charged, means for presetting a maximum value of charging energy to be permitted to be delivered to said battery, means for periodically halting the delivery of charging current, means for determining the instantaneous resistance free terminal voltage of said battery during each interval of time when delivery of the charging current has been halted, means for comparing said instantaneous resistance free terminal voltage to a reference voltage stored in a charge control module which is present in said charging station, means for reducing the charging current under control of said charge control module present in said charging station, and means for stopping the delivery of charging current to said battery in keeping with a signal issued by said charge control module present in said charging station or when said preset maximum value of charging energy has been delivered to said battery;

wherein the signal to stop delivery of charging current, and data which is indicative of the instantaneous terminal voltage of said battery, are transferred between said battery and said charging station over said communication means.

11. The apparatus of claim 10, wherein said communication means is chosen from the group consisting of dedicated data wires, power link carrier devices, optical fibres, optocouplers and associated data transfer means, inductive couplers and associated transfer means, and radio frequency transmitters and receivers.

12. The apparatus of claim 10, wherein said charging control module in said vehicle associated with said battery is specific to said battery and is such as to control delivery of charging energy to said battery, and further comprises:

(a) means for periodically interrupting the flow of charging current to said battery, means for detecting the instantaneous resistance free terminal voltage of said battery during each interval of time when delivery of charging current has been halted, and means for comparing said instantaneous resistance free terminal voltage of said battery to a reference voltage stored in said charging control module associated with said battery;

(b) means for delivering a constant current at a constant voltage to said battery, means for determining when a preset terminal voltage of said battery has been reached, and means for halting delivery of said constant charging current to said battery; and (c) means for sending pulses of charging current to said battery, means for briefly discharging said battery following each pulse of charging current, and means for halting all current flow to or from said battery until the initiation of the next charging pulse.

13. The apparatus of claim 10, wherein said module in said vehicle which at least identifies the maximum charging current and nominal charging voltage required for said battery is a preset calibrated divider network, whereby said divider network is such as to make the battery in said vehicle appear to the charge control module present in said charging station as if it is a standard lead-acid battery having a known terminal voltage and a known acceptable maximum charging current.

14. The apparatus of claim 9, wherein said means for presetting the charge station to predetermined allowable values of nominal charging voltage and maximum charging current comprises means for manually setting those values into value registers in said charging station, and a data interface in said charging station for inserting data into said value registers through said data interface; and wherein said data interface has means which are capable of reading a card which has said allowable values of nominal charging voltage and maximum charging current encoded thereinto by any of a magnetic stripe, punched holes, embossed depressions, and embossed mounds, any of which are compatible with a specific said data interface.

15. The apparatus of claim 10, wherein said means for presetting the maximum value of charging energy to be delivered to said battery comprises a meter having means to determine the amount of energy delivered to said battery and to determine the monetary price of the energy delivered to said battery, and means to terminate the delivery of charging current when a predetermined amount of energy has been delivered or a predetermined monetary price of energy has been delivered, whichever occurs first; and wherein the unit monetary price of energy may be altered depending on the time of day when charging current flows to said battery.

16. The apparatus of claim 10, comprising means whereby a plurality of vehicle batteries may be charged from a single charging station, means for distributing charging energy to any one of a plurality of switches or contactors, each of which has a unique designation, and means for selectively closing only one of said plurality of switches or contactors at any one time, so as to charge the one of said plurality of vehicle batteries which is connected to said one of said plurality of switches or contactors.

17. The apparatus of claim 16, wherein the order of sequentially closing one at a time of said switches or contactors may be determined by one of (a) means for closing said switches or contactors in sequence as to their respective unique designation; (b) means for establishing a priority as to whether the respective batteries connected through each respective switch or contactor shall be charged in order of those batteries requiring either the greatest amount or the least amount of charging energy to be charged first, and thence in ranking charge requirements thereafter; and (c) means for selectively designating which battery is to be charged first in keeping with a user-determined priority protocol.

18. The apparatus of claim 16, wherein each of said plurality of switches or contactors is connected to a single, common rectifier.

19. The apparatus of claim 10, further comprising means to periodically transfer at least the data which is indicative of the instantaneous terminal voltage of said battery over said communication means, means for monitoring the transfer of data over said communication means, and means for determining if no such transfer of data over said communication means has occurred within a predetermined period of time, whereby a signal to stop delivery of charging energy to said battery is issued in the event that said monitoring means detects no transfer of data over said communication means within said predetermined period of time.

20. A charging station for charging a battery for an electric vehicle, where the battery is capable of accepting initial charging current at a rate greater than 1C, and where said charging station is capable of delivering that charging current at a preset voltage which is suitable for the battery being charged, comprising:

at least two wires capable of carrying the maximum value of charging current to be delivered to said battery, and communication means capable of transferring data concerning the state of charge of said battery being charged between the battery and the charging station;

means for interrogating the vehicle over said communication means to determine if there is present and associated with said battery in said vehicle a battery specific charging control module, or to determine if there exists in said vehicle a personality module which identifies at least the criteria of maximum charging current and nominal charging voltage under which conditions the battery may be charged in the shortest possible time period; or in the absence of a battery specific charging module associated with said battery or a personality module which identifies at least the criteria of maximum charging current and nominal charging voltage under which conditions the battery may by charged in the shortest possible time period, to determine if there exists in said vehicle at least monitoring means to determine the value of terminal voltage of the battery being charged;

means for charging said battery by delivering charging current thereto under the control of a battery specific charging control module in said vehicle in the event that a battery specific charging control module is present in said vehicle, and means for stopping the delivery of charging current to said battery in keeping with a signal to do so issued by said battery specific charging control module;

means for charging said battery by delivering charging current thereto, initially at a maximum charging current and a nominal charging voltage in the event that a personality module which at least identifies the maximum charging current and nominal charging voltage is present, means for periodically halting the delivery of charging current and determining the instantaneous resistance free terminal voltage of said battery during each interval of time when delivery of charging current has been halted, means for comparing said instantaneous resistance free terminal voltage to a reference voltage stored in a charge control module which is present in said charging station, means for reducing the charging current under control of said charge control module present in said charging station, and means for stopping the delivery of charging current to said battery in keeping with a signal issued by said charge control module present in said charging station; and means for presetting the charge station to predetermined allowable values of nominal charging voltage and maximum charging current in the event that there at least exists in said vehicle monitoring means to determine the value of the terminal voltage of the battery being charged, means for presetting a maximum value of charging energy to be permitted to be delivered to said battery, means for periodically halting the delivery of charging current, means for determining the instantaneous resistance free terminal voltage of said battery during each interval of time when delivery of the charging current has been halted, means for comparing said instantaneous resistance free terminal voltage to a reference voltage stored in a charge control module which is present in said charging station, means for reducing the charging current under control of said charge control module present in said charging station, and means for stopping the delivery of charging current to said battery in keeping with a signal issued by said charge control module present in said charging station or when said preset maximum value of charging energy has been delivered to said battery;

wherein the signal to stop delivery of charging current, and the data which is indicative of the instantaneous terminal voltage of said battery, are transferred between said battery and said charging station over said communication means;

said apparatus further comprising means whereby a plurality of vehicle batteries may be charged from a single charging station, means for distributing charging energy to a plurality of switches or contactors, all of which are connected to a common rectifier, means for monitoring the energy output from said common rectifier, means for reducing the energy flow to any one or all of said plurality of switches or contactors, and means for precluding energy flow to any one or more of said plurality of switches or contactors;

whereby, when said energy output from said rectifier reaches a predetermined maximum energy flow and fewer than all of said plurality of switches or contactors are closed, and a further switch or contactor is closed, either said means for reducing energy flow to any or all of the connected switches or contactors performs its function, or said means to preclude energy flow to any one or more of said plurality of switches or contactors performs its function, so as to reduce said energy output from said rectifier to at least no greater than said predetermined maximum energy flow.

* * * * *